US006452965B1

(12) United States Patent
Suzuki

(10) Patent No.: US 6,452,965 B1
(45) Date of Patent: Sep. 17, 2002

(54) FAULT DETECTION CIRCUIT IN LOOP NETWORK

(75) Inventor: Chikara Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/412,340

(22) Filed: Oct. 5, 1999

(30) Foreign Application Priority Data

Oct. 5, 1998 (JP) ............................................ 10-282859

(51) Int. Cl.[7] ................................................. H04B 3/46
(52) U.S. Cl. ........................ 375/224; 359/110; 359/166
(58) Field of Search ................................ 375/211, 212, 375/213, 224; 359/110, 152, 155, 164, 166, 174, 176

(56) References Cited

U.S. PATENT DOCUMENTS

| 5,134,609 | A | * | 7/1992 | Mori et al. | 370/380 |
| 5,434,691 | A | * | 7/1995 | Yamane | 359/110 |
| 6,072,610 | A | * | 6/2000 | Kuroyanagi et al. | 359/110 |
| 6,226,268 | B1 | * | 5/2001 | Kunikyo et al. | 370/244 |

FOREIGN PATENT DOCUMENTS

| JP | 60-121847 | 5/1985 |
| JP | 61-187446 | 8/1986 |
| JP | 62-145940 | 6/1987 |
| JP | 63-84229 | 4/1988 |
| JP | 8-320816 | 12/1996 |

* cited by examiner

Primary Examiner—Don N. Vo
(74) Attorney, Agent, or Firm—Foley & Lardner

(57) ABSTRACT

A fault detection circuit in a loop network has a plurality of nodes including a host control unit connected in a closed loop on a signal line, and comprises an electro-optic converter connected to an input terminal of each node for converting an electrical input signal to an optical signal, an opto-electric converter connected to an output terminal of each node for converting an optical signal to an electrical output signal, a selecting circuit for selecting either an electrical input signal to the electro-optic converter or an electrical output signal from the opto-electric converter, a first comparison input circuit for receiving one of a plurality of electrical input signals for comparison, a second comparison input circuit for receiving different one of the electrical input signals from the one received by the first comparison input circuit for comparison, a comparison circuit for comparison output signals from the two comparison input circuits in synchronization, and a fault determination circuit for determination based on the comparison result of the comparison circuit.

11 Claims, 3 Drawing Sheets

FAULT DETECTION CIRCUIT IN LOOP NETWORK

BACKGROUND OF THE INVENTION

1. Field of the Invention

The present invention relates to a fault detection circuit in a loop network, more particularly to a fault detection circuit in a loop network which can easily identify a faulty node in a short time.

2. Description of the Related Art

In a loop connection utilizing an FCAL (Fiber Channel Arbitrated Loop: ANSI standard), all nodes are connected on a single line in closed loop shape. Thus, since a fault in a node affects all subsequent nodes, determination of which node is a true faulty node requires analysis of fault histories of all nodes, which is very difficult to achieve and takes a long time.

SUMMARY OF THE INVENTION

In view of the aforementioned problem in the prior art, it is an object of the present invention to provide a fault detection circuit in a loop network which can easily identify a faulty node in a short time.

To solve the problem, a fault detection circuit in a loop network according to the present invention having plurality of nodes including a host control unit connected on a single line in a closed loop is characterized in that each node is connected at its input terminal to an electro-optic (hereinafter referred to as E/O) conversion circuit for converting an electrical input signal to an optical signal, connected at its output terminal to an opto-electric (hereinafter referred to as O/E) conversion circuit for converting an optical signal to an electrical output signal, and connected to a selecting circuit for selecting either an electrical input signal to an E/O conversion circuit or an electrical output signal from an O/E conversion signal.

Additionally, the fault detection circuit in a loop network is characterized in that it has a first comparison input circuit for receiving one of a plurality of electrical input signals for comparison, a second comparison input circuit for receiving different one of the electrical input signals from the one received by the first comparison input circuit, a comparison circuit for comparing output signals from the two comparison input circuits in synchronization, and a fault detection circuit for determination based on the comparison result of the comparison circuit.

The present invention has an effect that a faulty node can be easily identified in a short time with an instruction from the host control unit connected to the loop network. Additionally, the present invention has an effect that an intermittent fault can be also easily identified.

DESCRIPTION OF THE PREFERRED EMBODIMENT

An embodiment of the present invention will be described with reference to the drawings.

Figure 1:
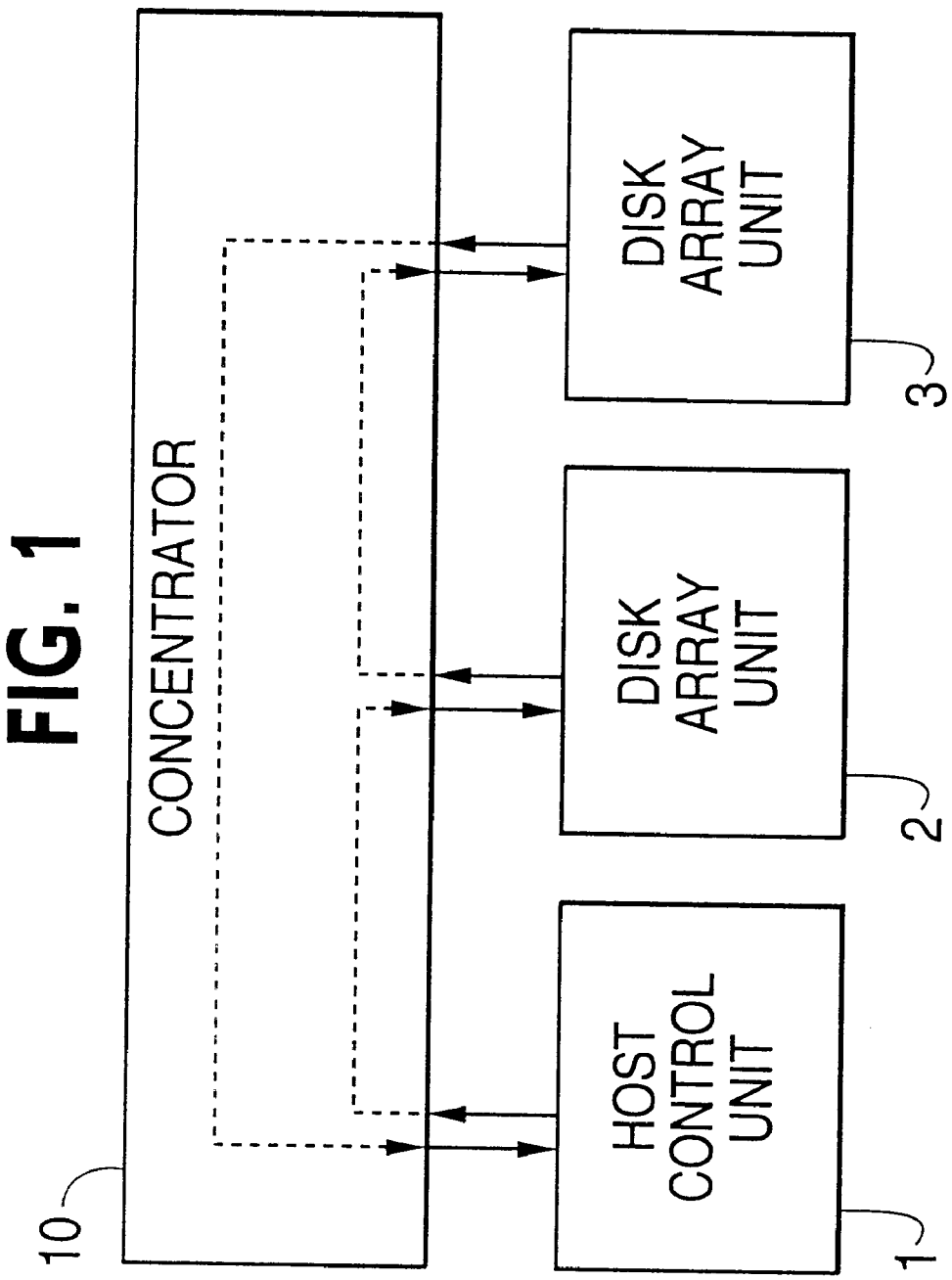
FIG. 1 is a conceptual illustration showing a configuration of a loop network connected through an FCAL.
Figure 2:
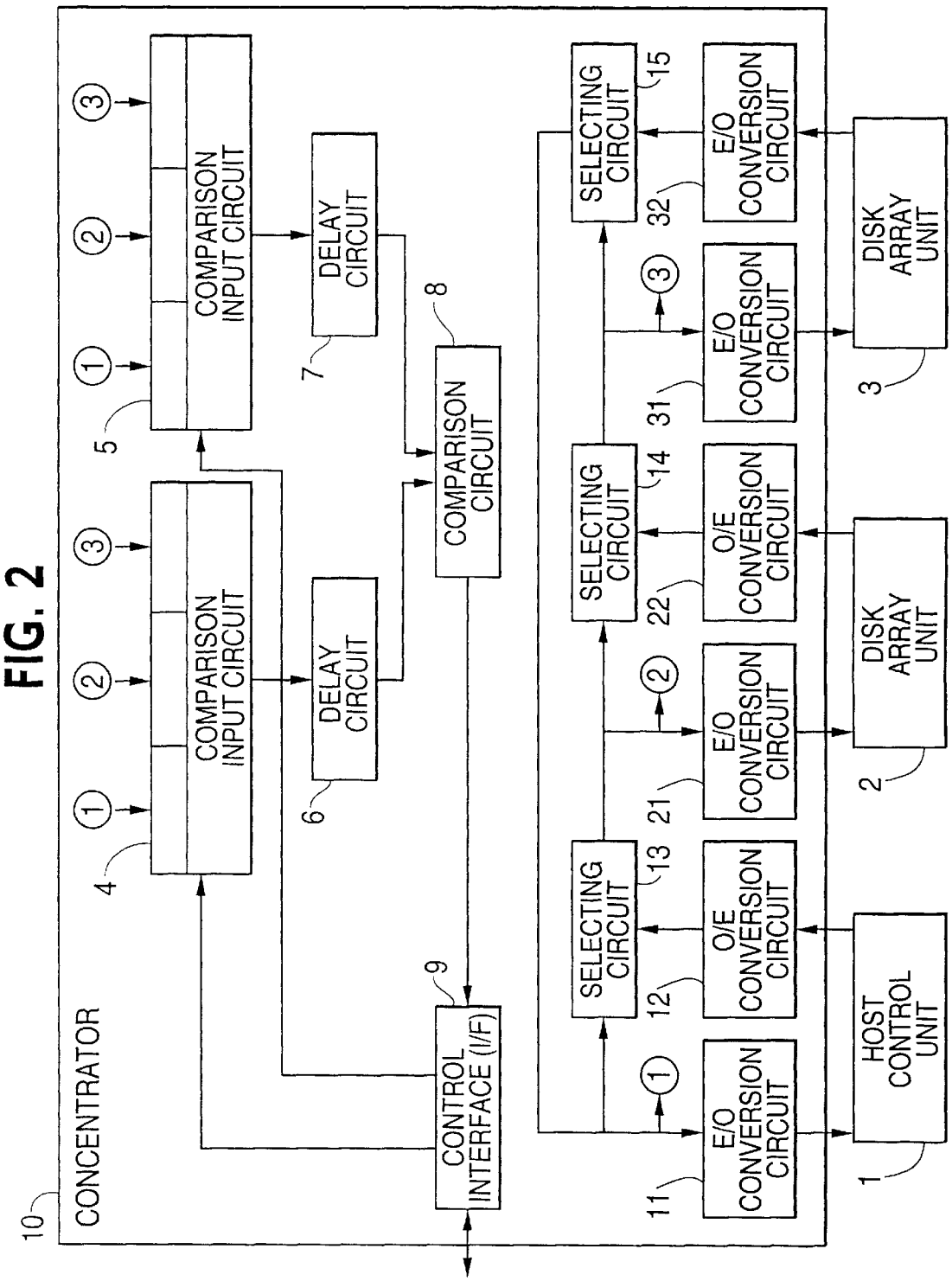
FIG. 2 is a block diagram showing a configuration of an embodiment of the present invention.

FIG. 1 is a conceptual illustration showing a configuration of a loop network connected through an FCAL, and FIG. 2 is a block diagram showing a configuration of an embodiment of the present invention.

Referring to FIG. 1, a loop network of the embodiment is shown using a concentrator which can connect three nodes, i.e. one host control unit and two disk array units. The loop network connected through the FCAL has host control unit 1, disk array unit 2, and disk array unit 3 connected on a single line in loop shape. Each node is managed with an address unique to that node. Host control unit 1 and disk array units 2, 3 are arranged to be connected to concentrator 10 through the FCAL.

For a configuration of the embodiment, as shown in FIG. 2, host control unit 1 and disk array units 2, 3 are connected to E/O conversion circuits 11, 21, 31 for converting electric signals to optical signals, and to O/E conversion circuits 12, 22, 32 for converting optical signals to electrical signals. E/O conversion circuits 11, 21, 31 and O/E conversion circuits 12, 22, 32 are connected to selecting circuits 13, 14, 15 for selecting whether an input signal at the previous stage or an input signal at the stage before the previous stage is inputted to an E/O conversion circuit.

Faults to be detected in the embodiment include a fault in each node of host control unit 1, disk array units 2, 3 in the loop network, and a break in a cable for connecting respective nodes, or the like. A fault detection circuit of the embodiment detects these faults as the same fault.

Each selecting circuit selects either an input signal to each E/O conversion circuit or an output signal from each O/E conversion circuit to output the selected signal to an E/O conversion circuit of a downstream node. The selecting circuit normally (when the power of a node is on) performs processing of transmitting data to a node and sending data transmitted from the node to the next node. When the power of a nodes is not turned on, the selecting circuit performs processing of bypassing the node to send data directly to the next node.

Concentrator 10 comprises E/O conversion circuits 11, 21, 31, O/E conversion circuits 12, 22, 32, selecting circuits 13, 14, 15 for selecting input signals to the E/O conversion circuits, comparison input circuits 4, 5 for selecting input signals to the E/O conversion circuits with an instruction from host control unit 1, delay circuits 6, 7 for delaying output signals from the two comparison input circuits 4, 5, comparison circuit 8 for comparing data from two delay circuits 6, 7, and control interface (I/F) 9 for sending the comparison result to the outside.

Delay circuits 6, 7 are provided for synchronization between two comparison input signals. For example, when data is outputted from host control unit 1 itself, the data propagates round through disk array unit 2, disk array unit 3, and host control unit 1 in this order. When data (1) and (2) are compared, delay circuits 6, 7 delay data (2) which is a comparison input for synchronization with data (1).

Control signals, not shown, are sent from host control unit 1 to comparison input circuits 4, 5, delay circuits 6, 7, and comparison circuit 8.

Next, a fault monitoring operation in the embodiment will be described.

Each of selecting circuits 13, 14, 15 selects an input signal from an upstream selecting circuit to an E/O conversion circuit when no input signal is present from each node to an E/O conversion circuit. When an input signal to an E/O conversion circuit is present, it selects an output signal from an O/E conversion circuit with a high priority. The selected signal is transferred to the next downstream node. An input signal from an upstream selecting circuit to an E/O conversion circuit is sent to comparison input circuits 4 and 5 for obtaining a comparison input.

Figure 3:
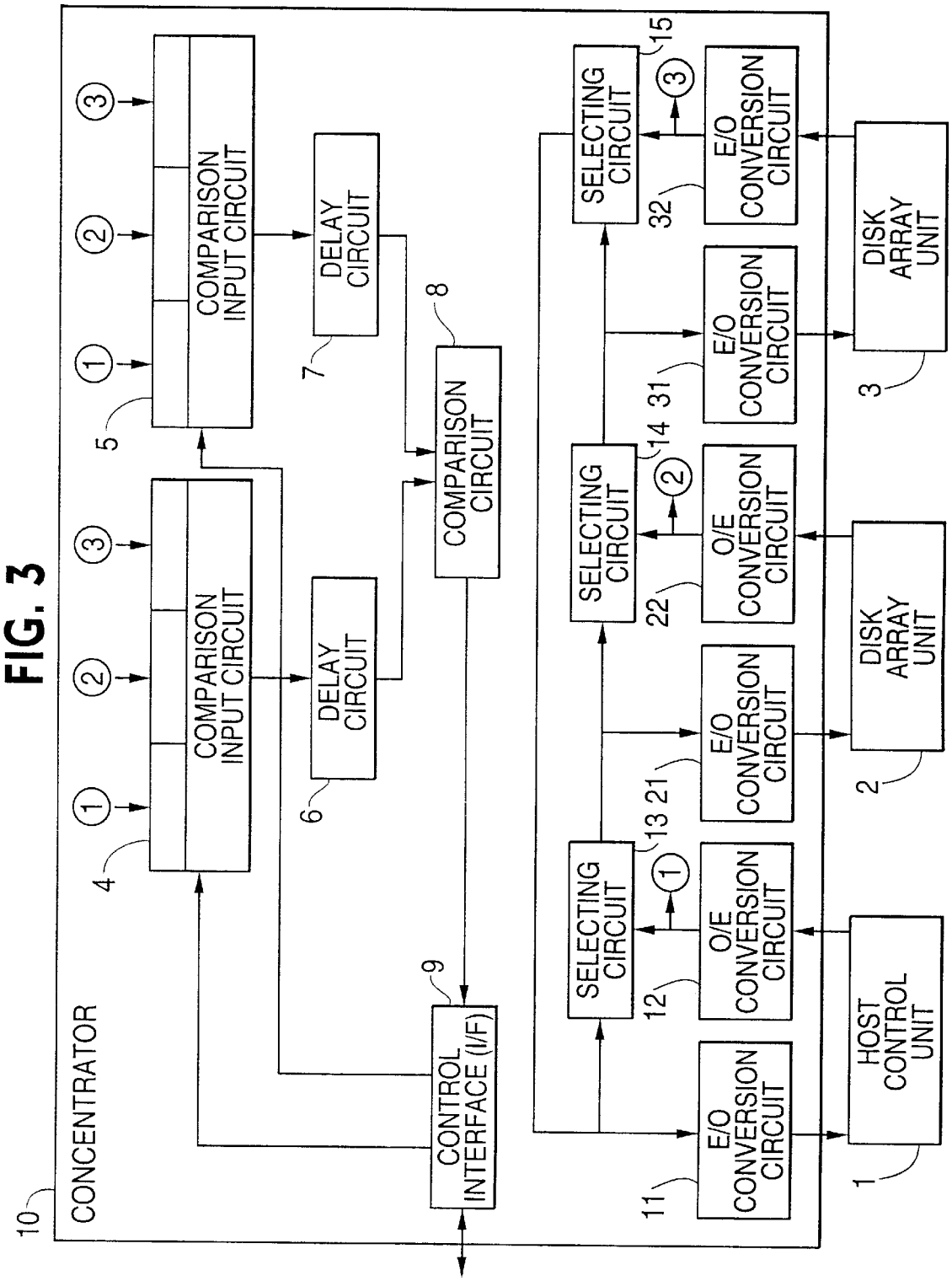
FIG. 3 is a block diagram showing a configuration of another embodiment of the present invention.

It goes without saying that an output signal from each O/E conversion circuit may be used as a comparison input signal instead of an input signal to an E/O conversion circuit, as shown in FIG. 3.

During a normal fault monitoring operation, as shown in FIG. 2, data outputted from host control unit 1 including address information of the host control unit itself propagates to downstream disk array unit 2 through O/E conversion circuit 12, selecting circuit 13 and E/O conversion circuit 21. Similarly, the data including address information of the host control unit itself propagates from disk array unit 2 to downstream disk array unit 3 through O/E conversion circuit 22, selecting circuit 14 and E/O conversion circuit 31. Additionally, the data is returned round from disk array unit 3 to host control unit 1 which corresponds to a downstream side through O/E conversion circuit 32, selecting circuit 15 and E/O conversion circuit 11. The above description takes the case of a data signal including address information of the host control unit itself. However, in the case of data including address information on each disk array, each disk array unit monitors a signal propagating on a line, and the data is received by a disk array corresponding to the address information and does not propagate downstream thereafter.

However, when a fault occurs in a node within the loop, data including address information of the host control unit itself is interrupted somewhere, resulting in a different data pattern returned to the host control unit. In this case, although the occurrence of the fault is detected, information on which node is faulty can not be obtained.

Therefore, as a monitoring operation under fault conditions, host control unit 1 instructs comparison circuit 8 to compare an input (data (2)) to disk array unit #0 with an input (data (3)) to disk array unit #1. If the comparison result shows that data (2) is different from data (3), it determines a fault between disk array #0 and the concentrator. On the other hand, if the comparison result shows that data (2) and data (3) are the same data, it determines no fault present between disk array #0 and the concentrator. Next, host control unit 1 instructs a comparison between an input (data (3)) to disk array unit #1 and an input (data (1)) to the host control unit.

In this manner, since the fault detection circuit sequentially compares all input data to respective nodes adjacent to each other in synchronization, difference between input data to respective adjacent nodes, if any, means difference in propagated data, allowing determination as a fault in a path.

Although the fault detection circuit has been described in conjunction with a comparison between input data to respective adjacent nodes, the comparison is not limited to a comparison between input data, and needless to say, the fault detection can be achieved with a comparison between output data from respective adjacent nodes, or between input data and output data of a node.

In the embodiment, the fault detection circuit has been described for a concentrator which can connect three units of one host control unit and two disk array units, it is not limited to three unit connection, and a concentrator of m unit connection is possible. Also in this case, a faulty node can be identified with a processing flow as described above.

What is claimed is:

1. A fault detection circuit in a loop network, comprising:
   a plurality of nodes including a node connected to a host control unit;
   a loop network arranged to be connected to said plurality of nodes on a single line in closed loop shape;
   an electro-optic conversion circuit connected to an input terminal of each node for converting an electrical input signal to an optical signal;
   an opto-electric conversion circuit connected to an output terminal of each node for converting an optical signal to an electrical output signal;
   a selecting circuit corresponding to each node for selecting either an electrical input signal to said electro-optic conversion circuit or an electrical output signal from said opto-electric conversion circuit;
   a first comparison input circuit for receiving one of a plurality of the electrical input signals for comparison;
   a second comparison input circuit for receiving different one of the electrical input signals from the one received by said first comparison input circuit for comparison;
   a comparison circuit for comparing output signals from said two comparison input circuits in synchronization; and
   a fault determination circuit for determination based on the comparison result of said comparison circuit.

2. The fault detection circuit in a loop network according to claim 1, wherein said first and second comparison input circuits use as inputs electrical input signals or electrical output signals of nodes adjacent to each other.

3. The fault detection circuit in a loop network according to claim 1, wherein said first and second comparison input circuits use as inputs one of a plurality of electrical input signals or electrical output signals on the basis of an instruction of said host control unit.

4. The fault detection circuit in a loop network according to claim 1, wherein the synchronization of the output signals from said first and second comparison input circuits is provided by a delay circuit.

5. A fault detection circuit in a loop network, comprising:
   a plurality of nodes including a node connected to a host control unit;
   a loop network arranged to be connected to said plurality of nodes on a single line in closed loop shape;
   an electro-optic conversion circuit connected to an input terminal of each node for converting an electrical input signal to an optical signal;
   an opto-electric conversion circuit connected to an output terminal of each node for converting an optical signal to an electrical output signal;
   a selecting circuit corresponding to each node for selecting either an electrical input signal to said electro-optic conversion circuit or an electrical output signal from said opto-electric conversion circuit;
   a first comparison input circuit for receiving one of a plurality of the electrical output signals for comparison;
   a second comparison input circuit for receiving different one of the electrical output signals from the one received by said first comparison input circuit for comparison;
   a comparison circuit for comparing output signals from said two comparison input circuits in synchronization; and
   a fault determination circuit for determination based on the comparison result of said comparison circuit.

6. The fault, detection circuit in a loop network according to claim 5 wherein said first and second comparison input circuits use as inputs electrical input signals or electrical output signals of nodes adjacent to each other.

7. The fault detection circuit in a loop network according to claim 2, wherein said first and second comparison input circuits use as inputs one of a plurality of electrical input signals or electrical output signals on the basis of an instruction of said host control unit.

8. The fault detection circuit in a loop network according to claim 5, wherein the synchronization of the output signals from said first and second comparison input circuits is provided by a delay circuit.

9. A fault detection circuit in a loop network, comprising:

a plurality of nodes including a node connected to a host control unit;

a loop network arranged to be connected to said plurality of nodes on a single line in closed loop shape;

an electro-optic conversion circuit connected to an input terminal of each node for converting an electrical input signal to an optical signal;

an opto-electric conversion circuit connected to an output terminal of each node for converting an optical signal to an electrical output signal;

a selecting circuit corresponding to each node for selecting either an electrical input signal to said electro-optic conversion circuit or an electrical output signal from said opto-electric conversion circuit;

a first comparison input circuit for receiving the electrical input signal to said electro-optic conversion circuit of each node for comparison;

a second comparison input circuit for receiving the electrical output signals from said opto-electric conversion circuit of each node for comparison;

a comparison circuit for comparing output signals from said two comparison input circuits in synchronization; and a fault determination circuit for determination based on the comparison result of said comparison circuit.

10. The fault detection circuit in a loop network according to claims 9, wherein said first and second comparison input circuits use as inputs one of a plurality of electrical input signals or electrical output signals on the basis of an instruction of said host, control unit.

11. The fault detection circuit in a loop network according to claim 9, wherein the synchronization of the output signals from said first and second comparison input circuits is provided by a delay circuit.

* * * * *